United States Patent [19]
Juenger et al.

[11] Patent Number: 5,141,401
[45] Date of Patent: Aug. 25, 1992

[54] STRESS-RELIEVED ROTOR BLADE ATTACHMENT SLOT

[75] Inventors: Jerome A. Juenger, Cincinnati; Stephen C. Peterson, West Chester; Frederick C. Herzner, Fairfield, all of Ohio

[73] Assignee: General Electric Company, Cincinnati, Ohio

[21] Appl. No.: 589,152

[22] Filed: Sep. 27, 1990

[51] Int. Cl.⁵ .............................. F01D 5/30
[52] U.S. Cl. .................. 416/219 R; 416/248
[58] Field of Search .......... 416/219 R, 248, 223 A, 416/239

[56] References Cited

U.S. PATENT DOCUMENTS

| | | | |
|---|---|---|---|
| 2,729,422 | 1/1956 | Scharf | 416/219 R |
| 3,887,987 | 6/1975 | Salt | 29/407 |
| 3,922,169 | 11/1975 | Hagen | 416/219 R |
| 4,169,694 | 10/1979 | Sanday | 416/219 R |
| 4,191,509 | 3/1980 | Leonardi | 416/219 |
| 4,692,976 | 9/1987 | Andrews | 416/219 R |

FOREIGN PATENT DOCUMENTS

| | | |
|---|---|---|
| 632001 | 7/1936 | Fed. Rep. of Germany ... 416/219 R |
| 1062881 | 8/1959 | Fed. Rep. of Germany . |
| 58167807 | 10/1983 | Japan . |
| 59113206 | 6/1984 | Japan . |
| 423431 | 4/1967 | Switzerland . |
| 2011552 | 7/1979 | United Kingdom . |
| 2100808 | 3/1983 | United Kingdom . |

Primary Examiner—Edward K. Look
Assistant Examiner—Michael S. Lee
Attorney, Agent, or Firm—Jerome C. Squillaro; James P. Davidson

[57] ABSTRACT

To eliminate stress peaking at the bearing surface interface of the blade and disk slot dovetails in a gas turbine engine, the slot dovetail in undercut to remove disk material from contact with the blade dovetail radially inner edges where surface stress peaking would otherwise occur. The undercut contour radially inward of the blade dovetail is determined by analysis based on each engine design such as to achieve a substantially uniform distribution of surfaces stress along the dovetail slot fillet radius.

6 Claims, 2 Drawing Sheets great STRESS-RELIEVED ROTOR BLADE
ATTACHMENT SLOT

The present invention relates to turbomachinery and particularly to rotor assemblies utilized therein.

BACKGROUND OF THE INVENTION

Rotor assemblies of turbomachinery, such as gas turbine engines, are comprised of rows of rotor disks, each having attached about its periphery a distributed array of blades. The typical method of attaching the blades to the disks is to provide side-entry, dovetail slots into which the dovetail root sections of the blades are slidingly received and captured. During engine operation, relative sliding motion between the blade dovetails and the disk dovetail slots occurs due to centrifugal loading which causes the disk outer diameter to grow larger allowing the blades to slide radially outward. Associated with this blade loading and sliding motion is a resisting frictional shearing force on the interfacial surfaces of the blade and slot dovetails. In addition, Hertzian contact stresses are developed at the interface of the contacting surfaces due to the normal crush and frictional shear loads. The magnitudes of these stresses depend on the dovetail geometries of the blade and slot, interface coefficient of friction, and blade loading. The surface stresses associated with normal crush loads are compressive, while those associated with frictional shear can be either tensile or compressive depending on the direction of shear loading.

For high thrust engines utilizing highly loaded blades, the tensile surface stresses associated with frictional shear loads have been found through analysis and actual testing to be quite high. These high stresses, when applied cyclically as during normal engine operation, can exceed the fatigue capabilities of the fan blade and/or disk, resulting in the creation of cracks.

To relieve surface stresses due to frictional shear, attention has been directed to minimizing the friction over the interface surfaces of the blade and slot by the application of a dry film lubricant, such as molydisulfide. This approach is also beneficial in reducing fretting or galling of the blade and slot dovetail surfaces as they rub against each other. Fretting has been found to have a particularly negative impact on low cycle fatigue (LCF) capability due to the potential for initiating premature cracking. While lubrication of the interface surfaces does reduce coefficient of friction, this beneficial effect is not lasting due to degradation under the harsh operating environment of a gas turbine engine. Periodic relubrication is thus required to reestablish the desired low interface surface coefficient of friction. Frequent maintenance of this type is inconvenient and costly.

Another approach to relieving frictional stresses along the blade-disk interface has been to reduce normal crush stress by changes in slot geometry This can be accomplished by increasing the contact area of the interface. However, this requires increasing the size of the blade and slot dovetails, resulting in heavier fan blades and rotor disk. This is contrary to the current design emphasis of reducing engine weight. Another proposed geometry change is to reduce the pressure face angle of the blade and slot dovetail contacting surfaces. However, this results in higher normal loads at their interface and has the further disadvantage of increasing the stress in the dovetail slot fillet radius due to increased bending stress on the disk material between the slots.

To improve gas turbine engine performance in commercial and military aircraft, the design emphasis is directed toward increasing operating speeds, temperatures and pressures while also reducing engine weight. This results in increased centrifugal loading of the fan blades and thus excerbation of the surface stress problem in the dovetail slot with attendant reduction in low cycle fatigue life.

SUMMARY OF THE INVENTION

It is accordingly an object of the present invention to provide an improved blade to rotor disk attachment in a gas turbine engine.

A further object is to provide an improved dovetail slot geometry effective in vastly improving the low cycle fatigue (LCF) life of a blade to rotor disk attachment.

An additional object is to provide a dovetail slot geometry effective in reducing peak frictional stresses at the interface between the blades and disks of rotor assemblies in a gas turbine engine.

Another object is to provide a dovetail slot geometry such as to provide a more uniform distribution of surface stress along the contour of the slot.

Yet another object is to provide a method for improving the low cycle fatigue life of rotor assemblies utilized in gas turbine engines.

Other objects of the invention will in part be obvious and in part appear hereinafter.

In accordance with the present invention, to reduce frictional stresses at the edges of the bearing surfaces of the blade and slot dovetails in gas turbine engine rotor assemblies, which have been found to occur in the dovetail slots at locations contacted by the radially inner edges of the blade dovetails, the slot contour is undercut such as to eliminate disk material that would otherwise contact the blade dovetail inner edges. The absence of disk material at this critical dovetail slot location adjacent and colinear with the frictional shear load eliminates the associated tensile stress thereat. The undercut radially inward from the blade root edge is contoured depending upon the design characteristics of a particular engine to achieve substantially uniform distribution of surface stresses along the sides of the dovetail slot.

The invention accordingly comprises the features of construction, combination of elements and arrangement of parts, all as set forth below, and the scope of the invention will be indicated in the claims.

DESCRIPTION OF THE DRAWINGS

For a full understanding of the nature and objects of the invention, reference may be had to the following Detailed Description taken in conjunction with the accompanying drawings, in which.

DETAILED DESCRIPTION

Figure 1:
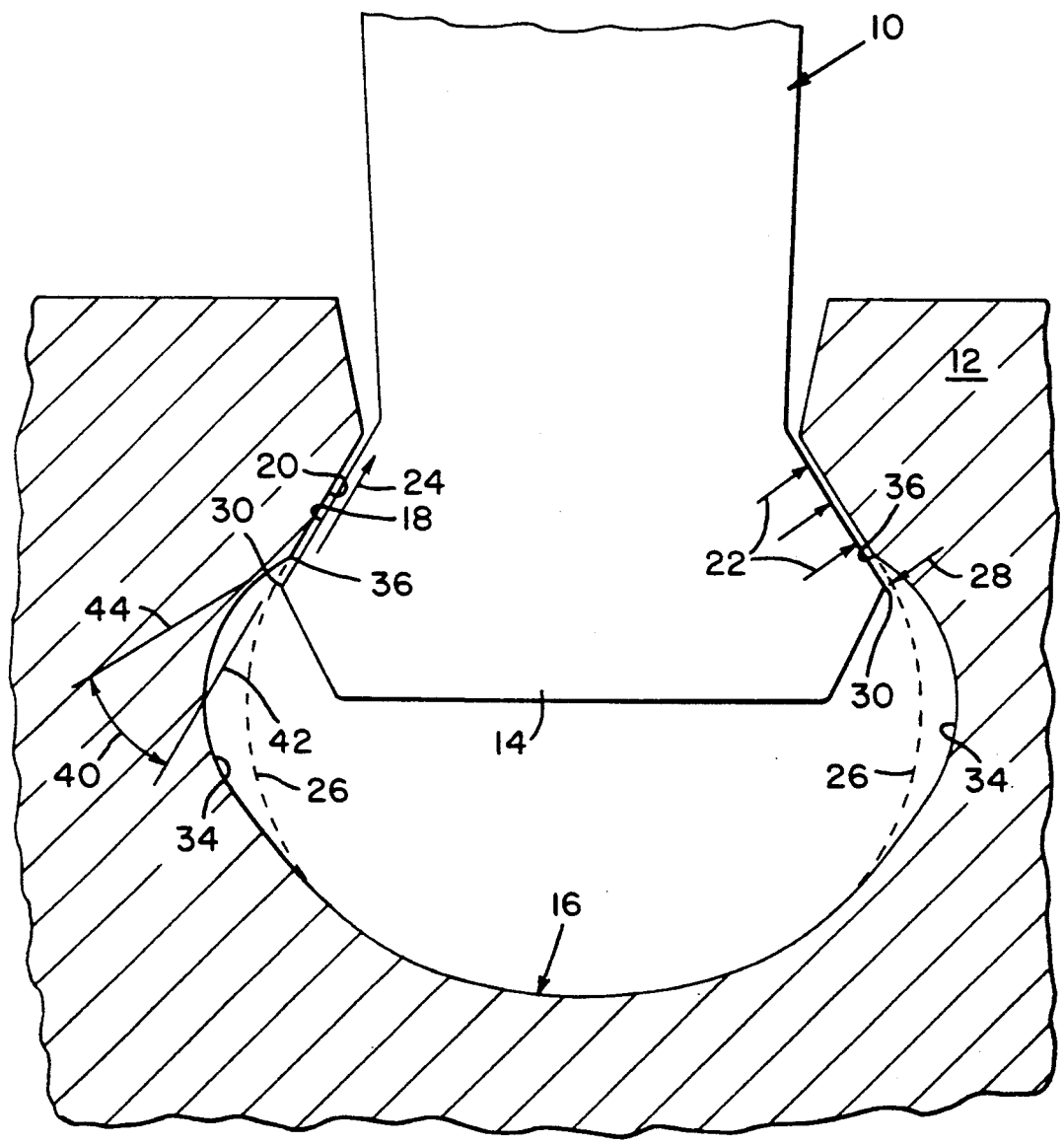
FIG. 1 is an enlarged, fragmentary side view of a rotor assembly, focusing on a single dovetail slot which is provided with undercuts contoured in accordance with the present invention.

In the fragmentary side view of FIG. 1, numeral 10 references a blade and numeral 12 references a disk of a rotor assembly in a gas turbine engine. The root section 14 of the blade is dovetail-shaped and is received in a side-entry, dovetail-shaped slot, generally indicated at 16, in the disk periphery. Blade dovetail 14 is formed at each side with an inclined flat bearing surface 18 which contacts an inclined, flat bearing surface 20 along each side of the radial opening of disk dovetail slot 16 through which the airfoil section 15 of the fan blade extends. During engine operation and consequent centrifugal loading of blade 10, these bearing surfaces slide relative to each other at their interface due to disk radial growth. Arrows 22 represent normal crush loading on the disk, while arrow 24 represents frictional shear loading on the disk. It will be understood that bearing surfaces 18 and 20 are shown in slightly gapped relation for ease of identification.

Figure 2:
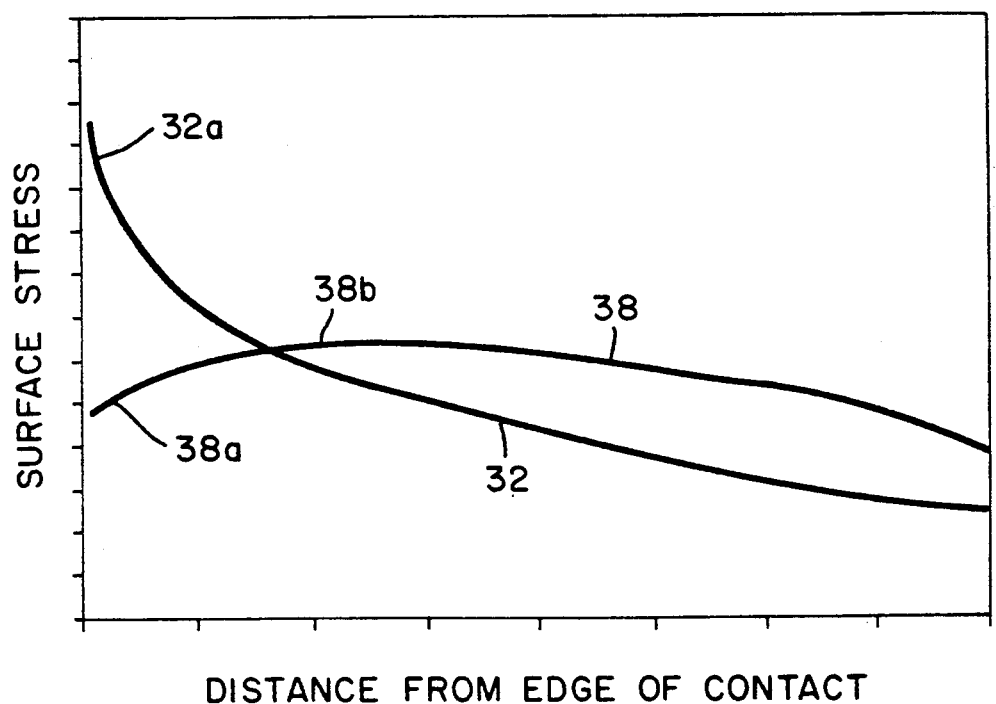
FIG. 2 is a graph of stresses over the dovetail slot surface to illustrate the improvements achieved by the present invention.

Heretofore, the contour of the dovetail slot sides essentially conformed to that illustrated by dash lines 26. This contour was selected based on analysis and testing focused on lowering the surface stresses over the fillet radius of the dovetail slot below the blade dovetail. A recent investigation of a fatigue cracking problem in the slot surface led to the discovery that surfaces stress along the dovetail slot peaked at the location, indicated by arrow 28, coinciding with the radially inner edges 30 of blade bearing surface contact with slot bearing surfaces 20. Curve 32 in FIG. 2, which represents a plot of surface stress under high friction conditions versus distance radially inward along slot surface 26 starting from edge 30, dramatically shows this stress peaking at 32a. This curve, obtained from a finite element analysis, also shows that slot profile 26 achieves the heretofore primary objective of decreasing surface stress in the slot fillet radius.

In accordance with the present invention, the sides of dovetail slot 16 are undercut to provide surface contours indicated at 34. Most importantly, this undercut begins along lines 36 on the slot surface, which are spaced slightly radially outwardly of blade dovetail edges 30. This spacing is sufficient to preclude these blade edges from sliding into contact with disk bearing surfaces 20 under maximum centrifugal loading of fan blade 10. The benefits of undercut 34 are shown by curve 38 in FIG. 2. Note that the surface stress peak at location 28 in FIG. 1 with slot contour 26, represented by curve portion 32a, is significantly reduced with slot undercut 34, as indicated by curve portion 38a. It is also seen from curve 38 that surface stress is reasonably uniformly distributed over the surface of undercut extending radially inward of blade edge 30, albeit at consistently higher magnitudes than in the case contour 26. However, it is found that the elimination of surface stress peaking adjacent to the inner blade edge significantly increases the low cycle fatigue life of the rotor assembly. This has been proven in laboratory testing of both dovetail shapes, i.e., the heretofore shape 26 and the undercut shape 34. Test specimens containing each of these geometries were tested in a specifically designed test rig to simulate the relative motion of the blade against the disk as well as the relevant crush loads 22 and frictional shear loads 24. In testing the blade/disk interfaces containing no lubricant to simulate high friction, the undercut shape 34 demonstrated over a three-fold improvement in fatigue life. This improvement was consistent over a range of loading magnitudes and loading methods, i.e., pure LCF type loading as well as LCF with vibratory type loading superimposed. In low friction testing with the interface surfaces lubricated, the two shapes had equivalent fatigue lives.

That frictional shear stress peaking in the slot surface opposite blade edges 30 is eliminated can be appreciated from the fact that undercuts 34 remove disk material exists from contact with these blade edges. Relative sliding motion between bearing surfaces still exits, but no disk material exists adjacent to and colinear with the frictional shear load in which tensile stresses can be produced. From curve 38, it is seen that maximum surface stress at point 38b is well removed radially inward from the contact interface of bearing surfaces 18 and 20. Thus, these bearing surfaces, if and when they become fretted or galled and thus their low cycle fatigue capability degraded, are not subjected to stress peaks which would otherwise lead to premature fatigue failure.

An additional related advantage of the present invention is that blade and disk bearing surfaces typically receive an anti-fret wear coating to discourage fretting thereof. It has been found that the application process, typically plasma spraying, has the potential of reducing the fatigue capability of the base metal underlying the anti-fret coating. Again, since undercuts 34 effectively remove the peak surface stress locations from the bearing surfaces to locations having higher material properties, the overall fatigue life of the rotor assembly is significantly improved.

It will be appreciated that the maximum depth of the undercuts and their contour for relieving stress peaking at the blade dovetail lower edges and for uniformly distributing surface stresses over the dovetail slot surface radially inward thereof is dependent on the crush load distribution, coefficient of friction at the interface of the bearing surfaces, pressure angle of this interface, etc., of a particular engine design. Such undercut contour features are determined by known techniques, such as finite element and boundary element analysis, photoelastic testing, etc.

A particularly important undercut contour feature contributing to achieving the objectives of the present invention is break angle 40. This is the angle between line 42 aligned with the bearing surface interface and line 44 tangent to undercut 34 at a point where it starts breaking away from disk bearing surface 20 at line 36. Ideally, the larger the break angle the better the results in terms of eliminating stress peaking at the blade dovetail edges 30. However, a large break angle, e.g., in excess of ninety degrees, weakens the disk material radially outward of line 36. It has been determined that, again depending on the particular engine design, the optimum break angle is in the range of three to sixty degrees.

The present invention thus provides a simple and eminently effective approach to increasing the low cycle fatigue life of rotor assemblies in gas turbine engines. This objective is achieved by eliminating stress peaks at locations on the disk surface most vulnerable to premature fatigue failure, namely bearing surfaces 20 which experience fretting during normal engine operation. As detailed above, undercuts 34 not only eliminate surface stress peaking at these critical locations, but may be contoured radially inward of these locations to uniformly distribute surface stresses along the sides of the dovetail slots.

It is seen from the foregoing that the objects set forth above, including those made apparent from the preceding Detailed Description, are efficiently attained, and, since certain changes may be made in the construction set forth without departing from the scope of the invention, it is intended that all matters of detail be taken as illustrative and not a limiting sense.

Having described the invention, what is claimed as new and desired to secure by Letters Patent is:

1. In a rotor assembly for turbomachinery having disk equipped with dovetail slots distributed about the periphery thereof for receiving the dovetails of blades, the improvement wherein:
   A. each said blade dovetail includes a first inclined bearing surface at each side thereof, said first bearing surfaces terminating at radially inner edges; and
   B. each said dovetail slot includes
      B1) a second inclined bearing surface at each side thereof, said second bearing surfaces in radially overlying, contacting relation with said first bearing surfaces during centrifugal loading of said blades, and
      B2) an undercut formed in each dovetail slot side, said undercuts beginning along lines on said second bearing surfaces located radially outward of said first bearing surface radially inner edges, wherein each of said undercuts
         i) eliminates from said disk, adjacent to and colinear with a frictional shear load occurring along said second bearing surface, at a critical location that would otherwise contact said first bearing surface inner edge, thereby eliminating surface stress peaks in said dovetail slot side at said critical location, and
         ii) relocates maximum stress in said dovetail slot side to a location radially inward from said critical location, wherein said radially inward location has higher material properties than those of locations along said second bearing surfaces, thereby improving the fatigue life of said rotor assembly.

2. The improvement defined in claim 1, wherein said undercuts are contoured radially inwardly from said beginning lines in a manner to substantially uniformly distribute surface stresses over said dovetail slot sides.

3. The improvement defined in claim 2, wherein said undercuts break away from said second bearing surfaces at said beginning lines at a break angle in the range of three to sixty degrees, wherein said break angle is formed between a first line which is parallel to said second bearing surface and a second line which is tangent to said undercut at said beginning lines.

4. A method for improving the low cycle fatigue life of a rotor assembly in a gas turbine engine, wherein the rotor assembly includes a disk equipped with dovetail slots distributed about the periphery thereof for receiving the dovetails of blades, each blade dovetail including at each side thereof a first bearing surface terminating at a radially inner edge, and each dovetail slot including at each side thereof a second bearing surface in radially overlying, contacting relation with the first bearing surfaces during centrifugal loading of the blades, said method comprising the step of forming an undercut in each side of the dovetail slots, each undercut beginning along a line on the second bearing surface located radially outward of the first bearing surface radially inner edge, thereby removing material from said disk, adjacent to and colinear with a frictional shear load occurring along said second bearing surface, at a location opposite said first bearing surface radially inner edge and eliminating any contact of the first bearing surfaces along the radially inner edges thereof with the dovetail slot sides.

5. The method defined in claim 4, which further includes the step of contouring the undercuts such as to provide an initial portion breaking away from the second bearing surfaces along the beginning lines at a break angle in the range of three to sixty degrees, wherein said break angle is formed between a first line which is parallel to said second bearing surface and a second line which is tangent to said undercut at said beginning lines.

6. The method defined in claim 5, which further includes the step of contouring the remaining portion of the undercuts radially inward of the initial portion to achieve a substantially uniform distribution of surface stresses along the dovetail slot sides.

* * * * *